United States Patent [19]

Pernicano

[11] Patent Number: 4,664,735
[45] Date of Patent: May 12, 1987

[54] HEAT TRANSFER SHEETING HAVING RELEASE AGENT COAT

[76] Inventor: Vincent S. Pernicano, 2833 Railroad St., Boyne Falls, Mich. 49713

[21] Appl. No.: 668,508

[22] Filed: Nov. 5, 1984

Related U.S. Application Data

[62] Division of Ser. No. 430,835, Sep. 30, 1982, Pat. No. 4,496,618.

[51] Int. Cl.$^4$ .................. B32B 3/18; B41M 3/14; B44C 1/65; B44C 1/16
[52] U.S. Cl. .................. 156/240; 156/230; 156/297; 156/309.6; 428/200; 428/207; 428/346; 428/914
[58] Field of Search .............. 162/164.1, 164.4; 156/62.2, 230, 240, 289, 231, 239, 249, 297, 298, 306.9; 350/98; 428/201, 200, 202, 204, 206, 207, 211, 323, 325, 346, 352, 354, 447, 448, 452, 513, 913, 914

[56] References Cited

U.S. PATENT DOCUMENTS

| | | | |
|---|---|---|---|
| 3,386,527 | 6/1968 | Daubert et al. | 428/354 |
| 3,632,386 | 1/1972 | Hurst | 428/352 |
| 3,716,437 | 2/1973 | Newman et al. | 428/354 |
| 3,755,070 | 8/1973 | Bey et al. | 162/164.4 |
| 3,896,249 | 7/1975 | Keeling et al. | 428/352 |
| 3,956,552 | 5/1976 | Geary | 156/62.2 |
| 4,248,500 | 2/1981 | Pernicano et al. | 350/98 |
| 4,305,781 | 12/1981 | Langley | 162/164.1 |

FOREIGN PATENT DOCUMENTS 2045823  11/1980  United Kingdom ............. 162/164.4

Primary Examiner—David Simmons
Assistant Examiner—Louis Falasco
Attorney, Agent, or Firm—Harold W. Milton, Jr.

[57] ABSTRACT

A heat transfer sheeting combination of the type for being applied to an article 10 to imprint a design thereon including a substrate 12, a design coating disposed on the substrate 12 and an adhesive layer 22 disposed on the design coating for adhesively securing the design coating to the article 10. The combination is characterized by the substrate 12 including a releasing agent coat 22 disposed between the design coating and the substrate 12 for facilitating the removal of the substrate 12 from the design coating after the application thereof onto the article 10.

6 Claims, 5 Drawing Figures

HEAT TRANSFER SHEETING HAVING RELEASE AGENT COAT

This is a division, of application Ser. No. 430,835, filed on Sept. 30, 1982, now U.S. Pat. No. 4,496,618.

TECHNICAL FIELD

The instant invention relates to heat transfer sheeting of the type including a design coating disposed on a substrate and an adhesive outer layer wherein heat applied to the substrate side of the sheet transfers the coating to an article, the adhesive securing the coating to the article.

BACKGROUND ART

Heat transfer sheeting has been a popular means for transferring a design or reflective design onto an article, such as a garment. An example of a prior art heat transfer sheeting is disclosed in the U.S. Pat. No. 4,248,500 to Pernicano et al.

As the art has developed, problems have been encountered wherein, after the application of a design coating to the article, the substrate or backing to the design coating is not easily removed. It has also been previously impossible to print a coating on a substrate wherein the coating comprises one color ink and an adhesive paste coat is printed directly over the color coat with the same screen without making any registration changes. Additionally, there have been problems with the edge of the transfer sheeting because the paper substrates of the prior art transfer sheeting absorb moisture.

SUMMARY OF THE INVENTION

A heat transfer sheeting combination of the type for being applied onto an article to imprint a design thereon including a substrate, a design coating disposed on the substrate, and an adhesive layer disposed on the design coating for adhesively securing the design coating to the article. The combination is characterized by the substrate including a releasing agent coat disposed between the design coating and the substrate for facilitating the removal of the substrate from the design coating after the application of the design coating onto the article.

FIGURES IN THE DRAWINGS

An embodiment of a heat transfer sheeting combination constructed in accordance with the present invention will now be described by way of example only, with reference to the accompanying drawings in which.

DETAILED DESCRIPTION OF THE DRAWINGS

Figure 1:
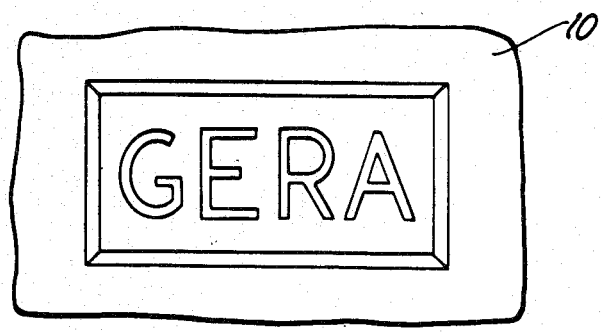
FIG. 1 is a heat transfer sheeting combination made in accordance with the subject invention and applied to an article.

FIG. 1 shows a heat transfer combination made in accordance with the subject invention applied to an article 10, such as fabric, making up an article of clothing. The heat transfer portion is defined by the letters GERA and the surrounding rectangular border.

Figure 2:
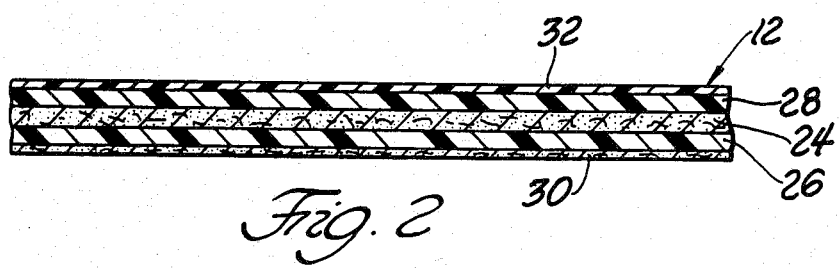
FIG. 2 is an enlarged fragmentary cross-sectional view of the substrate of the instant invention.
Figure 3:
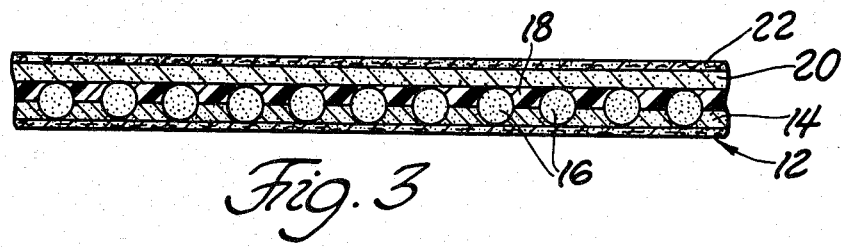
FIG. 3 is a fragmentary cross-sectional view of a heat transfer sheeting combination made in accordance with the subject invention before being applied to an article.
Figure 4:
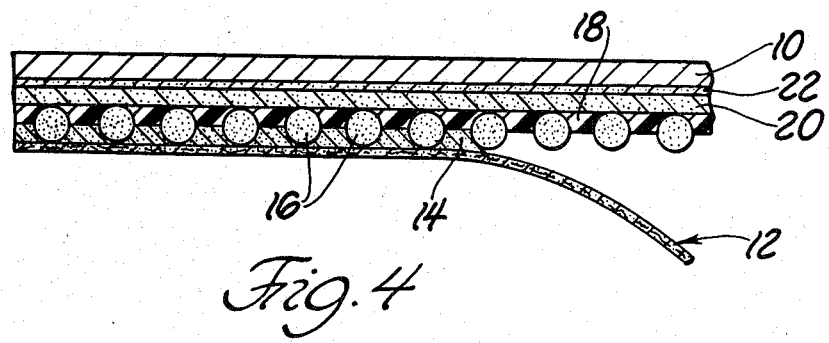
FIG. 4 is a fragmentary cross-sectional view of the heat transfer sheeting of the subject invention shown being applied to an article.

One embodiment of the subject heat transfer sheeting combination is shown in cross section in FIG. 2 in the configuration of the transfer before it is applied to an article. The heat transfer sheeting includes an absorbent substrate, generally indicated at 12. The combination further includes a design coating disposed on the substrate 12 as shown in FIGS. 3 and 4. The design coating includes a particle carrier layer 14 disposed in a predetermined pattern over the substrate 12 and a layer of reflective particles 16 partially disposed in the carrier layer 14. The carrier layer 14 may comprise a mixture of tack wax and solvent, i.e., mineral spirits and preferably oleum. The carrier layer 14 is responsive to heat for melting and being absorbed by the substrate layer 12 when the transfer is being applied to the article 10. The reflective particles 16 may comprise spherical glass beads 16 which are partially disposed or embedded within the carrier layer 14. The beads 16 are in engagement with the substrate 12 and have portions disposed above the carrier layer 14.

The design coating further includes an acrylic color ink 18 disposed over the reflective particles 16. A white back coat 20 is disposed over the acrylic color ink 18. The white back coat 20 includes a phenolic acrylic white ink. Alternatively, a single acrylic color coat 18 may be used alone.

An adhesive layer 22 is disposed on the design coating for adhesively securing the design coating to the article 10. The adhesive layer 22 includes an adhesive that is responsive to heat and pressure to adhesively secure the color coating to the article 10. More particularly, a powdered adhesive 22 is embedded in the design coating over the white back coat 20. The powdered adhesive comprises small particles of powder embedded into the surface of the design coating, the particles being responsive to heat and pressure. The powdered adhesive is thermosetting plastic and, preferably, consists of a polyester. Alternatively, a pressure-sensitive adhesive may be used.

An enlarged cross-sectional view of a substrate 12 of the instant invention is shown in FIG. 2. The substrate includes a layer of fibrous material 24, the fibrous material 24 consisting of paper. The fibrous material 24 is absorbent and absorbs the carrier layer 14 upon the application of the transfer to the article 10, as will be described below. The substrate 12 further includes a layer of thermoplastic material 26 and 28 adjacent each side of the fibrous material 24. The thermoplastic material 26, 28 may be polyethylene. The layers of thermoplastic 26 and 28 provide a stabilizing coating for stiffening the fibrous material 24 and protecting the fibrous material 24 from contamination. In other words, the fibrous material 24 is coated on both sides with layers 26 and 28 of polyethylene which is impervious to the penetration of moisture and is, therefore, very stable. Accordingly, the substrate 12 remains flat before and after it is printed because it absorbs no moisture from the printing ink 18 and 20 or from the atmosphere. Thusly, the polyethylene layers 26 and 28 provide dimensional stability by allowing multiple colors to be printed in perfect registration, as there is no change in the size of the sheet of fibrous material 24 from one color to the next. The polyethylene layers 26 and 28 further allow the printing of one color transfers and the printing of the adhesive layer 22 directly over the color coats 18 and 20 with the same screen without making any registration corrections. Further, the polyethylene layer 28, which is most directly adjacent to the acrylic color coat 18, keeps the inks of the acrylic color coat 18 wet so that the transfer sheetings that are dusted with adhesives for the adhesive layer 22 obtain an even coat of dust from edge to edge as opposed to prior art sheetings wherein the edges dried prior to the application of the adhesive.

Alternatively, a single layer of polyethylene 26 may be used to provide the stabilizing effect to an exposed surface of the substrate 12.

A second layer of fibrous material 30 is disposed over one of the layers 26 of the general plastic material. The second layer of fibrous material 30 may be a layer of tissue paper. The thin sheet of tissue paper 30 is laminated with the polyethylene layer 26. The tissue paper 30 acts as a barrier between the transfer press heat platen which applies the transfer sheeting to the article 10 and the layer of polyethylene 26. Since this polyethylene is a thermoplastic, it must be isolated from direct contact with the heat platen or it would stick to it. Directions or any other messages may be printed on the tissue paper 30.

The substrate 12 includes a releasing agent coat 32. As shown in FIGS. 3 and 4, the releasing agent coat 32 is disposed between substrate 16 and design coating for facilitating the removal of the substrate 12 from the design coating during the application of the design coating onto the article 10. The releasing agent coat 32 may be a silicone release agent. The releasing agent coat 32 may coat the porous fibers of the fibrous layer 24 directly or it may be disposed about the polyethylene layer 28 in such a way as to enable the fibrous material 24 to release acrylic water based inks printed directly on the surface. The releasing agent applied directly to the fibrous material 24 allows the material 24 to act as an absorbent carrier for the carrier layer 14 upon application of the transfer sheeting to the article 10. In other words, the releasing agent coat 32 coats each of the fibers of the fibrous material 24 so that the coated fibers still comprise a porous material that can absorb the melted carrier into the interstices of the fibrous material 24 between the coated fibers.

The layer 28 of polyethylene provides a deformable means disposed between the fibrous material 24 and the releasing agent coat 32 for deforming about the fibers of the article 10 during the application of the design coating thereto to form a mechanical bond with the article 10. Once the design coating is applied, the releasing agent coat 32 allows for the release of the substrate 12, including the polyethylene layer 28, from the fibers of the article 10 while the adhesive layer 22 retains the design coating on the article 10. More specifically, the releasing agent coat 32 forms a layer over the polyethylene coat, the fibrous material 24 having the layer 28 of polyethylene thereover. The releasing agent coat 32 provides a mat surface on the polyethylene layer, the mat surface being easier to print on and also giving the surface of the transfer a mat finish.

The layer 28 of polyethylene functions as a cushion between the fibrous material 24 and design coating so as to act like a putty upon the application of heat. Upon the application of heat, the polyethylene layer 28 becomes tacky so as to deform about the fibrous surface of the article 10 during the application of the transfer. In this way, the layer of polyethylene 28 is deformable so as to form a slight mechanical bond with the outer layer of fibers of the article 10. Upon cooling, the releasing agent coat allows the substrate 12 to be peeled off of the article 10 leaving only the design coating 18 and 20 glued in position by the adhesive layer 22, as shown in FIG. 4. The releasing agent coat 32, when disposed directly over the fibrous material 24, allows for the absorption of the carrier layer 14 by the fibrous material 24.

The releasing agent coat 32 releases easily in spite of flaws in the coating of beads 16 and carrier 14. The one step application is beneficial where automatic equipment is used to apply the transfers. Furthermore, the releasing agent coat 32 allows for the manufacture of a reflective transfer that does not require a wasted outside perimeter of carrier 14 and beads 16 around the transfer as it allows the color coat 18 and white backing coat 20 to be printed right onto the edge of the beads 16 without fear that any of the acrylic inks printed outside the beads 16 will release.

The deforming means, that is, the polyethylene layer 28, provides improved adhesion of the adhesive layer 22 due to the action of the melted polyethylene layer 28 which forces the design coat down into the fabric of the article 10. This action holds every line of detail of the design coating in position while the transfer is being applied.

The releasing agent coated paper may be commercially available absorbent silicone paper, or it may be prepared by treating paper stock with a silicone release agent. An example of a commercially available absorbent silicone paper is 2-OOMSK-1, manufactured by Daubert Chemical Company. An example of a silicone coating material used to treat stock paper is SS-4315 manufactured by General Electric Company. The coating material may be applied with coating equipment or may be sprayed onto the paper.

Figure 5:
FIG. 5 is a fragmentary cross-sectional view of a second embodiment of the subject invention.

An alternative embodiment of the instant invention is shown in FIG. 5. Like numbers are used to indicate a structure similar to the first embodiment described above. The embodiment shown in FIG. 5 is a heat transfer sheeting wherein only a color coating 18 is adhesively secured to an article, the color coating not including the beads 16 and carrier 14. The transfer includes a substrate 12 made in accordance with the instant invention and including the polyethylene layers 26 and 28, a color layer 18 and an adhesive layer 22. Alternatively, a white back coat may be disposed between the color coat 18 and the adhesive 22. The releasing agent coated substrate may also be used with other heat transfer sheeting combinations. For example, a lithographic heat transfer ink may comprise layer 18 in FIG. 5, the lithographic ink being disposed over the substrate 12. A clear plastisol or polyurethane layer is disposed over the lithographic ink. A white phenolic layer may be disposed over the plastisol polyurethane layers and an outer adhesive layer comprises the outer surface. A paste or producted adhesive may be used, depending upon the nature of the application.

If the design coating is to be applied to a tightly woven material, a modified clear plastisol adhesive may be used as the adhesive layer 22. Such a transfer adheres quite well to lycra, cotton, and other stretchable materials.

The invention has been described in an illustrative manner, and it is to be understood that the terminology which has been used is intended to be in the nature of words of description rather than of limitatiton.

Obviously many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A method of making a heat transfer sheeting combination comprising the steps of: applying a release agent coat (32) over a substrate (12) made from a fibrous material (24) and forming a fibrous matrix having vacant interstices of the releasing agent coated fibrous material (24) having fibers individually coated; applying a design coating over the fibrous matrix which includes applying a carrier layer (14) being responsive to heat for melting over the subtrate (12); and applying an adhesive layer (22) over the design coating, applying the transfer to an article (10) by applying the design coating with the adhesive thereon against the article (10) and applying heat and pressure to the substrate (12) to activate the adhesive layer (22) to bond the design coating to the article (10) and melting the carrier layer (14) and absorbing the carrier layer (14) solely into the interstices of the release agent coated fibrous material (24) of the substrate (12), and removing the releasing agent coated fibrous material from the bonded design coating.

2. A method as set forth in claim 1 wherein applying the releasing agent coat is further defined as using a silicone release agent over the fibrous material (24) to form the fibrous matrix.

3. A method as set forth in claim 1 further characterized by including the steps of applying a layer of thermoplastic material (26) to the fibrous material (24) whereby the thermoplastic material stiffens and protects the substrate (12) from contamination.

4. A method as set forth in claim 3 wherein the step of applying the layer of thermoplastic material is further defined by applying a layer of polyethylene (26) to the substrate (12).

5. A method as set forth in claim 3 further characterized by including the steps of applying the layer of thermoplastic material (26) over the substrate (12) on the side thereof opposite to the releasing agent coat (32) and applying a second layer of fibrous material (30) over the layer of thermoplastic material (26).

6. A method as set forth in claim 5 wherein the step of applying the second layer of fibrous material (30) is further defined by applying a layer of tissue paper.

* * * * *